United States Patent [19]

Sherman

[11] Patent Number: 4,844,235
[45] Date of Patent: Jul. 4, 1989

[54] VIBRATORY SEPARATION APPARATUS

[75] Inventor: Raymond W. Sherman, Barrington, Ill.

[73] Assignee: General Kinematics Corporation, Barrington, Ill.

[21] Appl. No.: 110,612

[22] Filed: Oct. 22, 1987

Related U.S. Application Data

[63] Continuation of Ser. No. 848,641, Apr. 7, 1986, abandoned.

[51] Int. Cl.$^4$ .......................... B65G 27/04; B07B 4/02
[52] U.S. Cl. .................................. 198/688.1; 198/771; 209/136; 209/147; 209/151; 209/920
[58] Field of Search ....................... 209/19, 20, 26, 27, 209/34, 35, 136, 137, 146, 147, 151, 153, 631, 634, 635, 699, 700, 920, 921, 931; 198/688.1, 771, 957

[56] References Cited

U.S. PATENT DOCUMENTS

| | | | |
|---|---|---|---|
| 2,007,190 | 7/1935 | Fraser | 209/474 |
| 2,667,969 | 2/1954 | Bishop et al. | 209/136 X |
| 2,674,374 | 4/1954 | Elliott et al. | 209/477 X |
| 3,015,308 | 1/1962 | Beresford | 198/771 X |
| 3,087,602 | 5/1960 | Hinkle, Jr. | 198/759 |
| 3,101,831 | 8/1963 | Gaddini | 198/303 |
| 3,224,553 | 12/1965 | Campbell | 198/771 X |
| 3,228,517 | 1/1966 | Yeasting | 198/771 |
| 3,473,657 | 10/1969 | Graf et al. | 209/931 X |
| 3,648,828 | 3/1972 | McCaffrey, Jr. et al. | 198/771 X |
| 3,836,085 | 9/1974 | Brown | 209/477 X |
| 3,956,109 | 4/1976 | Dietsche | 209/920 X |
| 4,482,046 | 11/1984 | Kraus | 198/771 |
| 4,490,247 | 12/1984 | Forsberg et al. | 209/137 X |
| 4,624,370 | 11/1986 | Danner et al. | 209/136 X |

FOREIGN PATENT DOCUMENTS

| | | | |
|---|---|---|---|
| 1053432 | 3/1959 | Fed. Rep. of Germany | 198/771 |
| 1091952 | 11/1960 | Fed. Rep. of Germany | 209/147 |
| 216911 | 7/1983 | German Democratic Rep. | 198/771 |
| 0638515 | 12/1978 | U.S.S.R. | 198/771 |
| 0783143 | 11/1980 | U.S.S.R. | 198/771 |
| 1106543 | 3/1968 | United Kingdom | 198/771 |
| 1362726 | 8/1974 | United Kingdom | 209/477 |

OTHER PUBLICATIONS

Powder Technology—J. M. Beeckmans, The Inclined Plane Particle Classifier—pp. 129-134—1981.

Primary Examiner—Robert B. Reeves
Assistant Examiner—Edward M. Wacyra
Attorney, Agent, or Firm—Wood, Dalton, Phillips, Mason & Rowe

[57] ABSTRACT

A resilient liner is provided on the particle supporting surface(s) of a vibratory conveyor system. The liner accounts for a live surface that counters the tendency of the particles, particularly those that are moist and sticky, from adhering to each other and the conveying surface. The liner is particularly effective in systems such as separating systems wherein the particles at various stages fall to other levels.

8 Claims, 6 Drawing Sheets

FIG. 11

VIBRATORY SEPARATION APPARATUS

This application is a continuation of Ser. No. 848,641, filed Apr. 7, 1986, now abandoned.

BACKGROUND OF THE INVENTION

1. Field of the Invention

The present invention relates to vibratory apparatus such as those used for particle separation and, more particularly, to structure for improving the conveying capability of vibrating surfaces supporting the conveying particles.

2. Background Art

It is known to provide a vibratory conveying structure to separate composite mixtures including particles of different size and density. An exemplary use for such a structure is to separate accumulated materials in a wood yard. The composite mixture may include wood fiber, dirt, stones, steel and/or other materials that commonly are found around such an operation.

A typical prior system uses a vibrating trough to advance the composite mixture from a supply source to a discharge area. The flow path along the trough is interrupted by a drop-out opening. The composite mixture is directed from a first plateau across the drop-out opening so that the trajectory of certain of the particles is intercepted by an angled landing surface at the discharge side of the drop-out opening and beneath the elevation of the first plateau. A forced air supply is directed substantially parallel to the flow on the first plateau and propels additional low density particles onto the landing surface or second plateau. The more dense particles fall to the bottom of the structure for accumulation in a first area while the particles on the landing surface are conveyed to a second, separate area.

One problem that has been contended with in the prior art structures is the lumping of sticky and moist material and its resistance to conveyance. For example, pitch laden wood chips tend to adhere to each other and the supporting conveying surface and retain other foreign matter. As a result, overall conveyance of the composite mixture is impaired as is the separation process.

The present invention is specifically directed to overcoming the above problem in a novel and simple manner.

SUMMARY OF THE INVENTION

According to the invention a resilient liner is provided on the particle supporting surfaces of a vibratory conveyor system. The liner accounts for a live surface that counters the tendency of the particles, particularly those that are moist and sticky, from adhering to each other and the conveying surface. The liner is particularly effective in systems such as separating systems wherein the particles at various stages fall to lower levels. Particles falling to the liner tend to rebound and collide more violently then they would on a conventional conveying surface.

Typically, a conveying surface is formed on the bottom of a trough with upright, spaced side walls, which confine the material transversely to its conveying direction. The invention contemplates the provision of a liner that overlies the flat, bottom conveying surface and extends upwardly against the side walls so that it is substantially U-shaped in cross section. To assure that the liner intimately overlies the bottom surface of the conveyor, the upwardly extending portions of the liner are anchored to the trough side walls in such a manner that there is a residual force urging the liner downwardly against the surface.

Preferably, the liner is formed from rubber. The particles tend to rebound off the live rubber liner, which action augments the breaking up accomplished by the normal vibrations imparted to the trough.

DETAILED DESCRIPTION OF THE DRAWINGS

Figure 1:
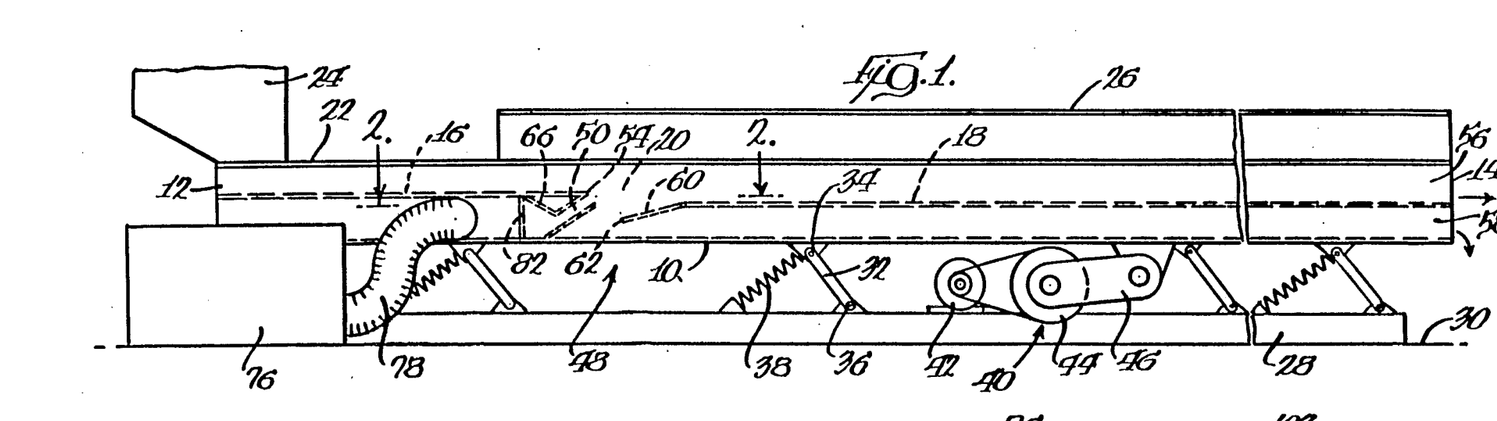
FIG. 1 is a sectional view of a vibratory separation system incorporating a preferred form of the invention.

An exemplary system to which the present invention is adaptable is illustrated in FIG. 1. The system comprises a trough 10 with an input end 12 and an open discharge end 14. The trough is divided into two horizontally disposed vertically spaced plateaus including an upper plateau 16 and a lower plateau 18 between which a dropout opening 20 is defined.

The trough has an upwardly opening area 22 adjacent the input end to admit a composite mixture from a source of supply 24. A hood 26 encloses the trough 10 from the discharge end 14 to a point beyond the dropout opening 20 to confine very light particles entrained in a forced air stream as described below.

The trough 10 is suspended for vibratory motion relative to a base 28, bearing against a support surface 30 for the system. A plurality of stabilizer links 32 interconnect the trough 10 and base 28. The links are arranged angularly with respect to the vertical, parallel to each other and each is pivotally connected at its upper end 34 with the trough and at its lower end 36 to the base. Reaction springs 38 act between the trough and base and are situated to make substantially a right angle with the stabilizer links 32. Although coil springs 38 are shown it is to be understood that leaf springs and/or resilient members could be used. The conveying apparatus may be any one of the well-known structures on the market.

The vibratory actuating means at 40 are conventional and consist generally of a base mounted motor 42 associated with an eccentric drive 44 which, through a link 46, imparts a controlled vibratory conveying motion to the trough.

Material moves ahead in the conveyor in a series of gentle throws and catches as a result of the controlled linear motion produced by the eccentric drive and stabilizer links. A coil spring reactor system is designed to match the resonant frequency to the eccentric drive speed. All of the forces required to decelerate and accelerate the trough are balanced by the forces developed by deflection of the coil spring reactors. The eccentric drive provides only the additional energy lost due to friction. Since each coil spring functions as an individual drive, all forces are uniformly distributed along the unit length.

Figure 2:
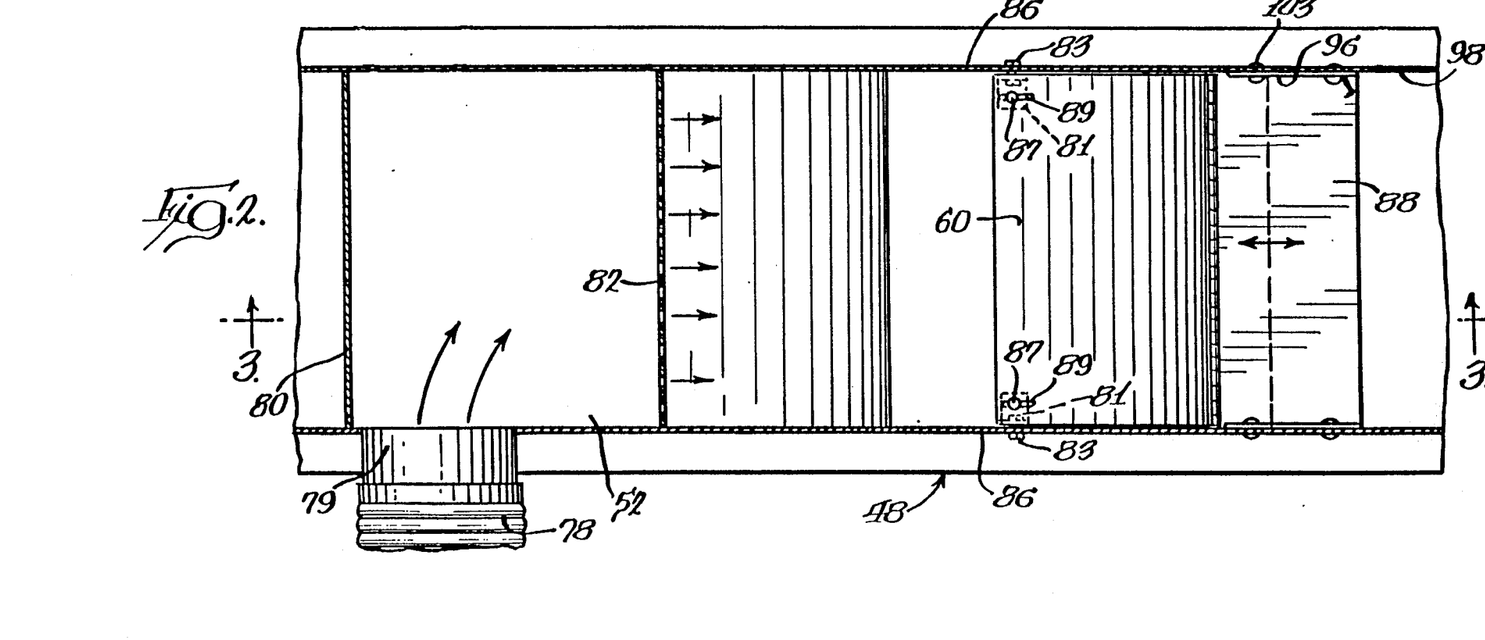
FIG. 2 is a sectional view f the main separation stage of the system along line 2—2 of FIG. 1.
Figure 3:
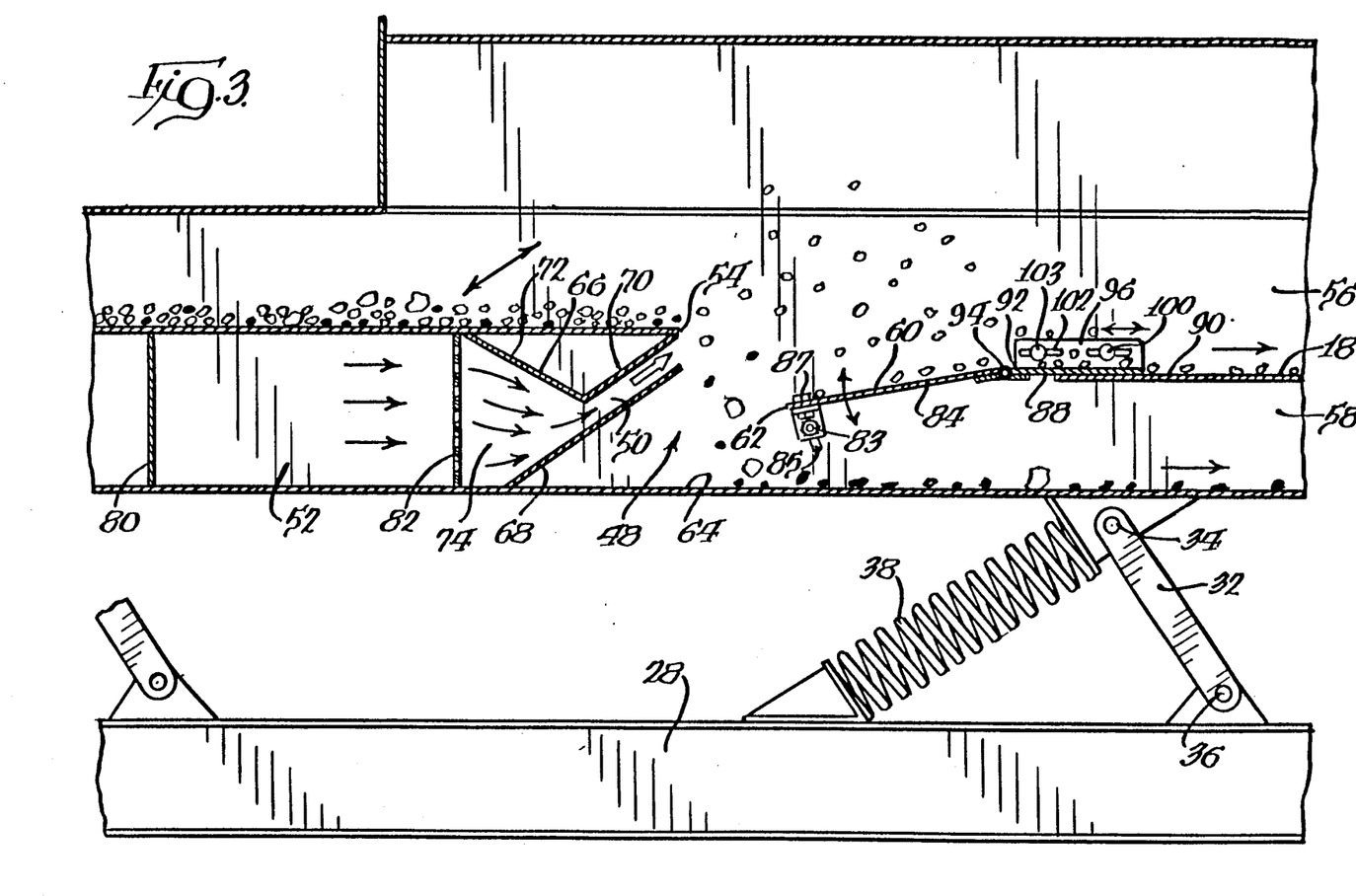
FIG. 3 is a sectional view of the main separation stage along line 3—3 of FIG. 2.

A primary separation stage is indicated generally at 48 in FIGS. 1–3. A duct 50 causes air from a pressurized chamber 52 to impinge upon particles passing over the edge 54 of the upper plateau 16. The action of the air upon the particles is demonstrated in FIG. 3.

The lower plateau 18 separates the lower density collection area 56 from the higher density collection area 58. A landing area 60 bounds the drop-out opening and intercepts the lighter particles that are dislodged by the air and propelled sufficiently toward the discharge end to pass the free edge 62 of the landing area 60. The heavier particles fall over the edge 54 and accumulate at the bottom wall 64 of the trough 10 for collection and conveyance through the high density area 58.

To direct the air from the pressure chamber, a V-shaped baffle 66 is mounted beneath the upper plateau 16. A deflector plate 68 extends angularly upwardly from the bottom wall 64 of the trough 10 and runs parallel to one leg 70 of the V-shaped baffle 66. The other leg 72 of the baffle defines in conjunction with deflector plate 68 a converging opening 74 between the pressure box and duct 50.

To supply the pressure chamber, a remote blower 76 is mounted to the surface 30 separate from the apparatus. The blower communicates through a flexible conduit 78 with the inside of the pressure chamber. The conduit 78 can be readily attached and removed by reason of an end fitting 79 provided on the pressure chamber. The pressure chamber is bounded by the upper plateau 16, the bottom 64 of the trough, a partition 80 at the inlet side of the conveyor and a diffuser plate 82 that is perforate to admit air from the pressure chamber to the converging opening 74 feeding the duct 50. The diffuser plate 82 and legs 72 and 70 of the baffle serve at the same time as a bearing support for the upper plateau 16.

For purposes of adjustment, the lateral edges 84 of the landing area are unconnected to the side walls 86 of the trough 10. A flat slide plate 88 is provided and facially engages the upper surface 90 of the lower plateau 18. The edge 92 of the slide plate toward the inlet side is hingedly connected with the landing ramp 60 for pivoting movement about a laterally extending axis 94. A locking arrangement is provided between the landing area 60 and the slide plate 88 to lock the angle of the landing area relative to the slide plate 88. One such structure is shown in FIGS. 2 and 3. Support brackets 81 in the form of right angles are bolted to the inside surface of each wall 86 by bolts 83 passing through openings in the one leg of the bracket and into slots 85 in the walls 86. The brackets 81 are raised or lowered to raise or lower the outer end 62 of the landing plate 60. The brackets 81 are secured to the underside of the landing plate 60 by a bolt 87 on the underside of the plate passing into an elongate slot 89 in the horizontal leg of the brackets 81.

The slide plate 88 has integral, vertical flanges 96 which closely abut the inside surface 98 of the trough side walls 86. Apertures 100 are provided in the side wall 86 in parallel relationship to the plane of the plateau 18 and coincide with elongate guide slots 102 in the flanges 96 with the slide plate flushly against the upper surface 90. Bolts 103 are extended through the coinciding apertures and slots and allow translation of the slide plate including the pivotally attached landing ramp between the ends of the trough. The bolts can be secured to fix the position of the slide plate where desired. As the slide plate 88 is adjusted horizontally, the landing plate 60 adjusts relative to the brackets by the bolts 87 in slots 89 in brackets 81.

It can be seen that by adjusting the landing plate in a counterclockwise direction about pivot 94 any higher density particles that are intercepted by the landing plate will be carried in the opposite direction from the direction of movement of the less dense material and will fall off the landing plate into the bottom wall 64 where they will be conveyed along with the other more dense material. More specifically, the vibratory conveyor is tuned to convey the material from left to right. The slope of the landing plate negates the conveying action of the more dense material on the landing plate causing it to be conveyed in a reverse direction, i.e. right to left. The less dense material still will move left to right toward the upper area 56. Graduated adjustments can be made to choose a desired line of separation.

By adjustably translating the landing ramp, the dimension of the drop-out opening in the direction of flow can be chosen. By enlarging the opening area, less dense and smaller sized particles will be intercepted by the landing ramp and routed to the lower density region 56. The two dimensional adjustment can be coordinated to sort out oversized and overdense particles by reverse flow as described above to arrive at the precise division of particles according to desired size and density.

Figures 4, 4A:
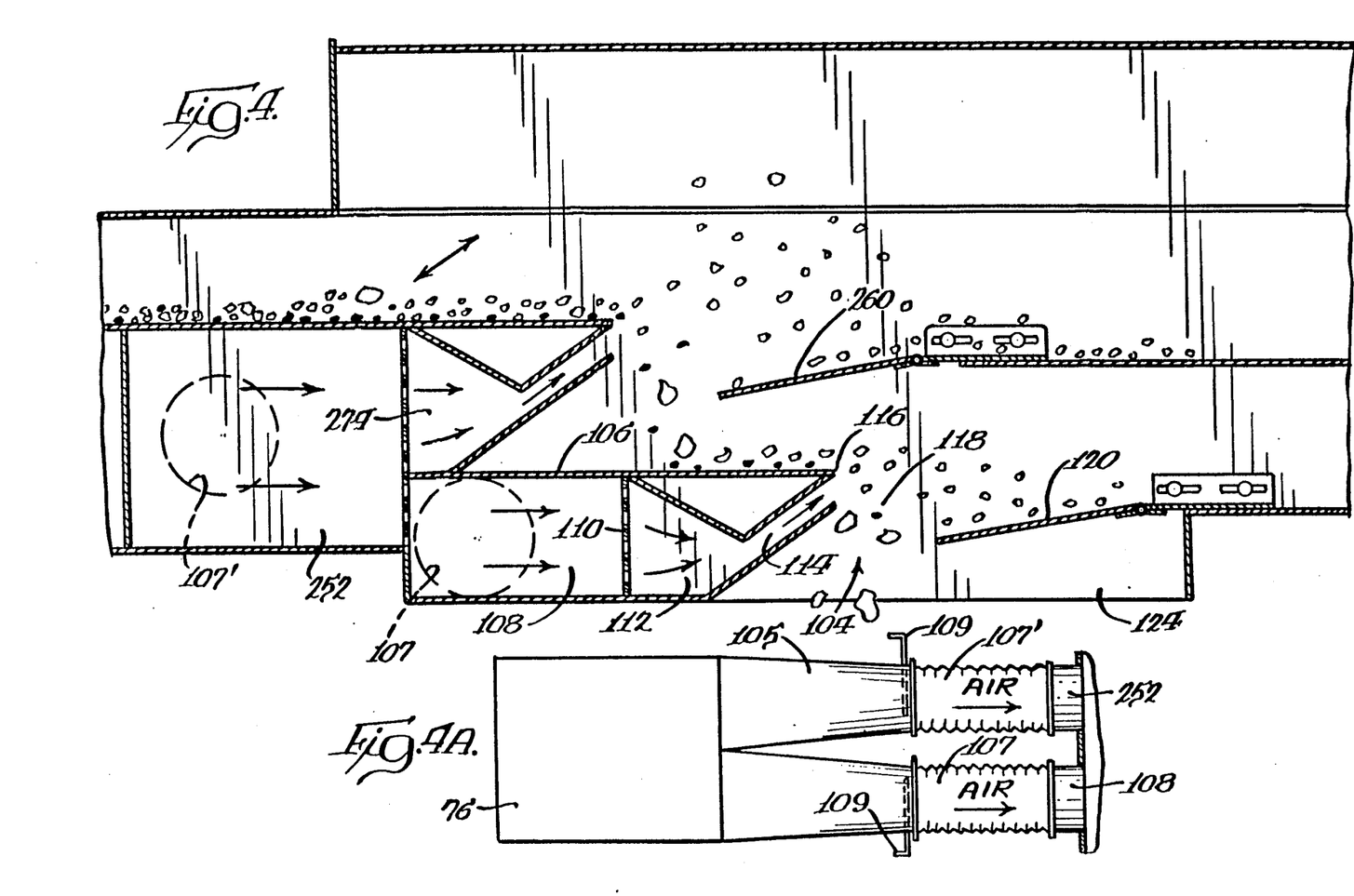
FIG. 4 is a sectional view of a modified structure according to the present invention including a second separation stage.
FIG. 4a is a schematic illustration of structure for generating air under pressure for the system.

A modification of the device in FIGS. 1–3 is shown in FIG. 4. The structure in FIG. 4 has an additional separation stage at 104 beneath the first stage and spaced toward the discharge end of the trough. The air supply from the fan 76 is divided (FIG. 4a) by a divider 105 at the fan outlet into two ducts 107, 107' with slide gates 109 located in each duct to control the air flow into chambers 252 and 108. The chamber 108 communicates through a perforate diffusion wall 110 through a converging chamber 112 in the second stage with a duct 114 which is disposed at an angle to the third plateau 106 to break up the particles passing beyond the edge 116 and passing over a second stage drop-out opening 118.

The third plateau 106 cooperates with the air from duct 114 and the landing area 120 in the lower stage substantially as the first stage previously described in relation to FIG. 3. The lower and second stage 104 adds an additional dimension to the apparatus. The landing areas 160 and 120, respectively on the first and second stages, are independently adjustable to vary the dimension of the drop-out opening and the angle of the landing areas 260,120 in relationship to the respective plateau.

The embodiment illustrated in FIG. 4 discharges the particles from the lower stage out a bottom opening in conventional manner. In operation, particles of a first size and/or density can be separated at the first stage, particles of a second size and/or density separated at the second stage and particles of a third size and/or density discharged through the bottom opening. Redundant separation might otherwise occur at the first and second stages for more complete separation.

Figures 5, 6, 7:
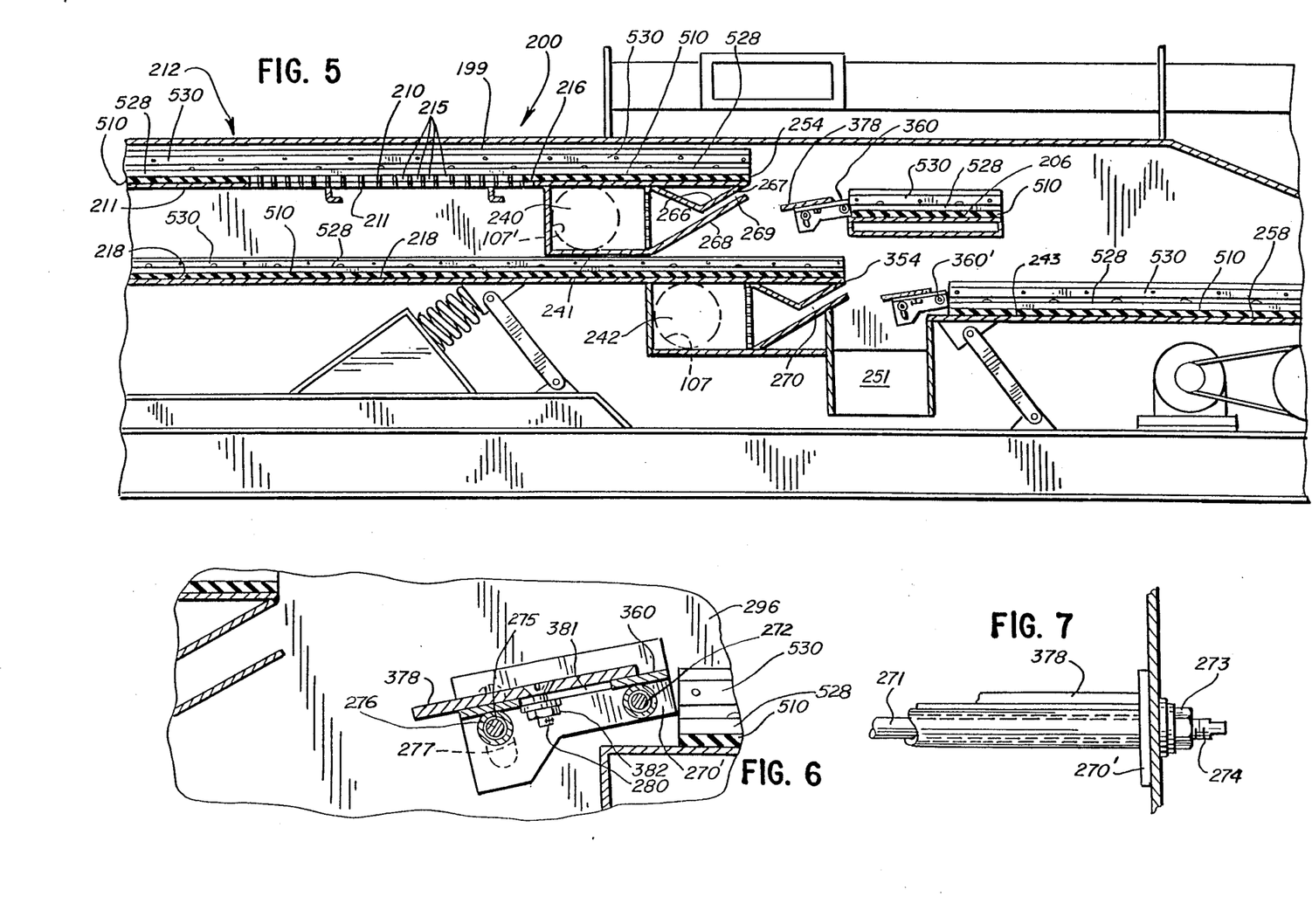
FIG. 5 is a sectional view. of a second modified structure with a liner according to the invention incorporated and showing initial coarse and fine separation followed by a two stage separation system.
FIG. 6 is an enlarged view of one form of angle and gap adjusting structure for the landing plate.
FIG. 7 is a partial elevational view of one end of the pivot rod for the landing plate of FIG. 6.

An additional modification is shown in FIGS. 5, 6 and 7 wherein there is illustrated a two stage separation apparatus employing an improved initial separation structure before the drop-out openings and an improved landing plate adjusting structure for adjusting the drop-out opening size and the landing plate angle.

The vibratory conveyor 200 has at an intermediate portion 199 adjacent an input end 212 of the trough 210 a perforated deck 211 with openings 215 of a particular size so as to pass particles of a particular size in the composite material therethrough. The trough 210 operates an upper plateau 216 with the small size particles falling through to a third lower plateau 218. The air supply from the fan 76 is divided in the same manner as shown in FIG. 4a with the air in duct 107' passing into a pressure chamber 240 (FIG. 5) and the air in duct 107 passing into chamber 242. The pressure chamber 240 is supported on the side walls of the conveyor and supports the trough 210 as in FIG. 1, with the bottom wall 241 of the chamber 240 being spaced above the second lower plateau 218 so that the smaller sized particles can be conveyed beneath the chamber 240.

The pressure chamber 240 has V-shaped baffle 266 with a deflector plate 268 parallel to leg 267 of baffle 266 so that the air stream from chamber 240 exits at an angle to the horizontal from duct 269 and impinges upon the particles passing over edge 254 with the less dense particles being propelled onto the improved landing plate 360 and second plateau 206 as will be described in detail hereinafter. The more dense particles will land on the third plateau 218 to join with the smaller size particles from the perforated deck 211. The combined particles will be conveyed over the edge 354 where the separately controlled air stream from the pressure chamber 242 and angled exit duct 270 propels the less dense particles onto a second improved landing plate 360' and fourth plateau 243, also as will be described hereinafter. The more dense material will drop out of the system through exit opening 251. The material from the second plateau 206 will fall onto the fourth plateau 243 and be conveyed as usable product to the exit 258.

As shown in FIGS. 5, 6 and 7 a modified structure is shown for the landing plate 360 for adjusting the drop out opening and for adjusting the angle of the landing plate 360. The landing plate 360 has flanges 270 on each end of the plate. A pivot rod 271 passes through openings 272 in side walls 296 of the conveyor and is secured thereto by nuts 273 threaded on threaded ends 274. The other portion of the flanges 270' have openings 275 through which bolts 276 pass. The bolts extend into arcuate shaped slots 277 in the side walls 296 and are secured by nuts on the outside of wall 296. Loosening the nuts o the bolts 276 will permit the angle of the landing plate 360 to be changed. Mounted on the plate 360 is an extension 378 which is slidably adjustable toward and away from the pressure chamber 240. The slidable adjustment being effected by studs 280 on the undersurface of extension 378 engaging through slots 381 in plate 360 and being locked in place by nuts 382. The landing plate 360 structure is duplicated at 360', one being for the second plateau 206 and the other being for the fourth plateau 243.

The landing plate 360 associated with the second plateau 206 is spaced above the second plateau 206 and is in fact relatively short in length relative to the plateau. The angle of the landing plate 360 is set and the extension 378 is properly adjusted for the size of particles to be received by the second plateau 206. The air stream from pressure chamber 240 is such that it propels and scatters the particles so that the less dense fly over the landing plate 360 and land directly on the second plateau 206. The more dense particles land on the landing plate 360 and due to the angle of the plate and the extent of vibratory motion will separate the less dense particles which will be conveyed forward and dropped onto the second plateau 206 with the more dense particles dropping back onto the third plateau 218 to join the particles from the perforated plate 211 and the previously dropped more dense particles from the first plateau 216.

The second landing plate 360 is adjusted the same as the first landing plate 360 and receives material propelled from the edge 354 by the air stream from pressure chamber 242. The least dense material is propelled onto the fourth plateau 243 with slightly more dense material landing on the landing on the landing plate 360' where it is separated into less dense material which is conveyed to the fourth plateau 243 with the more dense falling off the extension 378 into the discharge 251 along with the more dense material that did not get propelled to the second landing plate 360'.

The material from the second plateau 206 falls onto the fourth plateau 243 as the vibratory conveyor moves the material toward the discharge of the selected material at exit 258.

The separate pressure chambers 240 and 242 each have controls for varying the extent of the air streams issuing from the passages below edges 254 and 354. In this way the density of the material is separated and scattered toward the landing plates 360, 360'.

The embodiment shown in FIGS. 5, 6 and 7 incorporates many variables to accomplish a most unique end result. That is, the perforated plate 211 initially separates small particles from the composite material, the small particles falling onto a third plateau 218. The initial composite material without the separated smalls is subjected to the angled air stream with the less dense material being propelled to the second plateau 206, with the intermediate dense material falling on the landing plate 360 of the second plateau 206 where it is separated into more dense and less dense particles with the more dense particles falling in the dropout area with the dense material from the composite material. The material in the dropout area falls onto the third plateau 218 with the small particles separated by the perforated plate. The combined small and dense material passes over the second air stream where the least dense material is propelled to the fourth plateau 243 with the intermediate dense material landing on the landing plate 360' for separation into less dense and more dense particles. The more dense particles falling back out the dropout opening for discharge together with the heavy particles that were not propelled to the landing plate of the fourth plateau 243.

It should be understood that the landing plate 360 adjusting structure and spacing above its plateau 206 of FIGS. 5, 6 and 7 could be used in the two plateau structure of FIGS. 1-3 and the three plateau structure of FIG. 4.

Figures 8, 9:
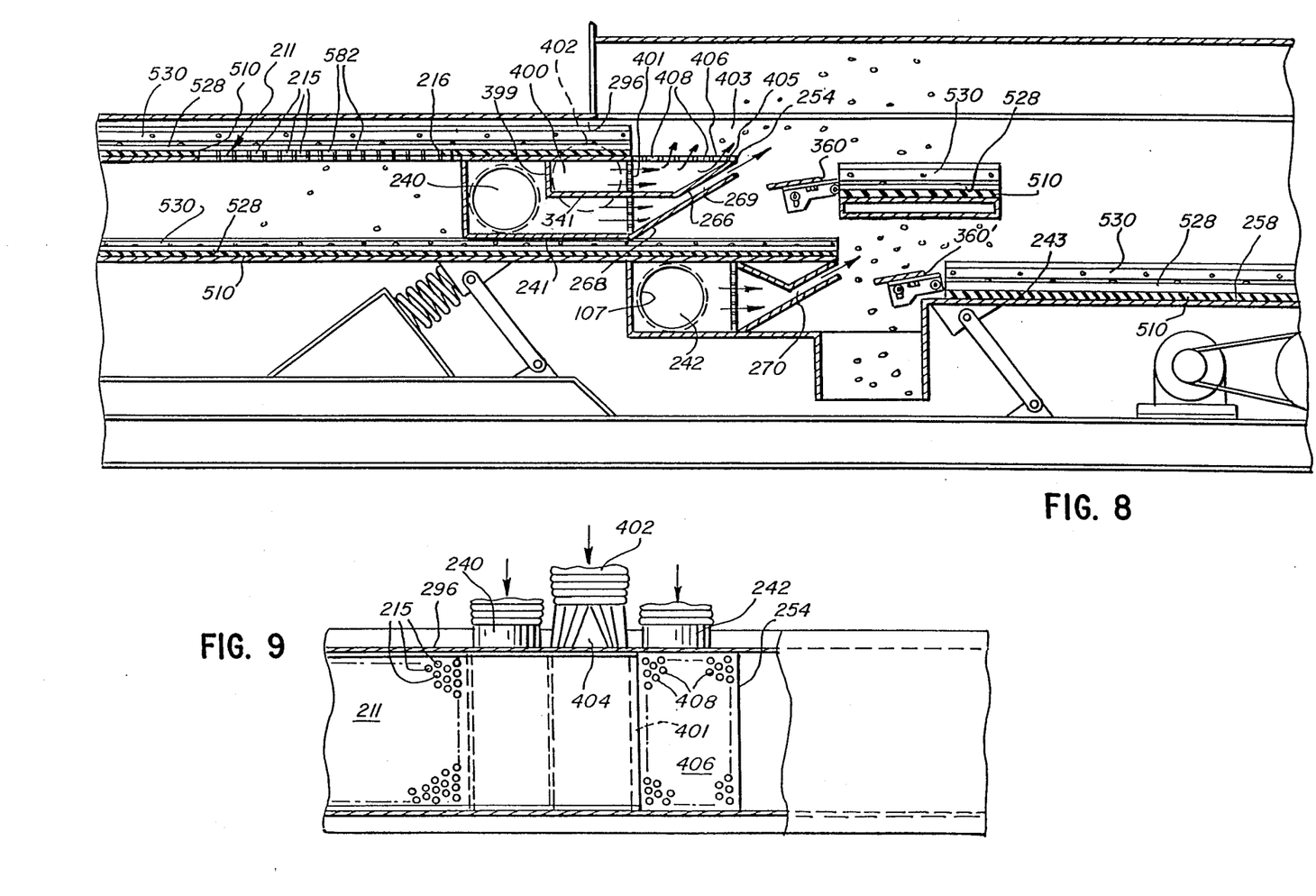
FIG. 8 is a sectional view of a third modified structure with a liner according to the invention incorporated and having an additional clump break-up structure.
FIG. 9 is a partially broken away top view of the FIG. 8 structure.

A further device suitable for incorporation of the present invention is shown in FIGS. 8 and 9, which illustrate a two stage separation device with a structure adapted to enhance break up of clumps of composite material. This separation device is similar to that of FIGS. 5-7 except for the additional structure described below, and thus like parts have been given like reference numerals in the Figures.

Enhanced clump break up is provided by a break up pressure chamber or pressure box 400 defined by solid walls 399, 341 and perforated wall 401. The pressure chamber of pressure box 400 extends across the width of the upper plateau 216 and is in communication with the blower 76 through a conduit 402 secured to a duct 404 in the wall 296. As an alternative conduit 402 is connected to its own individual source of air, which air may be hot air from a burner or from a boiler. When the air is from an individual source, its volume, pressure and temperature can be individually controlled. If more than one conduit 240, 242 and/or 402 is connected to a common source such as blower 76, control valves and dampers are needed to control the flow as desired. The pressure box 400 communicates with a diffusing chamber 403 which has part of its lower surface common with the baffle 266 to give an upward trajectory to air flowing through the diffusing chamber 403. A fluidizing deck 406 is defined as lying in a plane above the diffusing chamber 403 and extending too adjacent the edge 254. The fluidizing deck 406 is a foraminous surface 405 having openings 408, which openings are of a size determined by the fluidizing properties of the material. For example, bark chunks require more fluidizing air and therefore need larger openings 408 while saw dust needs less fluidizing air and therefore needs smaller openings 208.

With the above described structure, the vibratory motion of the trough 210 and deck 406 causes the composite material to move over the fluidizing deck where the material is fluidized as it passes over the openings 408 in the foraminous surface. Air from the break up pressure chamber 400 and diffusing chamber 403 blows up through the openings 408 to initially tumble and agitate the large bound together clumps. The fluidizing air works the various sized parts of the disintegrating clumps to form a bed of the parts of the composite material, allowing the heavier fraction to collect at the bottom or lower level of the bed. This causes some of the lighter loose particles to bob and jump above the upper level of the bed. The air from the break up pressure chamber 400 and chamber 403 adds to the vibratory motion to increase the agitation and tumbling of the composite material for abrading one clump against another and at the same time the pressurized air emitting from the openings 408 in the foraminous surface will tear, shred and rip the clumped and matted mass apart prior to the main separation stages of the device. The efficiency of the whole system is increased by the fluidizing air working the composite material bed and allowing the heavier fraction to collect at the bottom or lower level of the bed. This allows the heavier particles to fall down through the main air stream 269, without lighter particles hitting or impacting on heavies causing carry over. Since the openings 408 in the foraminous surface are not aimed in any direction except generally perpendicular to the surface 405, the lighter loading of material in the upper levels of the bed will initially not be propelled in any particular direction. However, the main air stream 269 will create a venturi effect which will cause air movement above both the surface 405 and the fluidized bed as well as below the deflector plate 268. The air movement will be toward the edge 254 which, together with the conveying direction of the vibratory feeder, will give direction to the fluidizing air emitting from the openings 408 and to the lighter fraction and suspended particles of the composite material. The lighter loose particles that are carried forward toward the second plateau 206 will be picked up by the main air stream 269 and propelled to the second plateau 206 and/or onto the landing plate 360 where they will be conveyed and separated as any material falling thereon from the first plateau 216. Some of the lighter fraction may fall short and pass to the third plateau 218. This is particularly important during recycling of materials through the separation device inasmuch as this composite material usually includes a large percentage of clumped and matted material. As an incidental benefit of the fluidizing of the clumped and matted material is the drying effect resulting from the air blast, which may be hot air from a burner or a boiler.

It should be understood that the above described fluidizing deck 406 could be used in the two plateau structure of FIGS. 1-3 and the three plateau structure of FIG. 4.

BEST MODE FOR CARRYING OUT THE INVENTION

In the foregoing detailed description, systems suitable for incorporation of the present invention have been described. These systems are exemplary only. The invention will be described specifically with respect to the embodiments in FIGS. 5-9, it being understood that a particular system design should not be viewed as limiting.

Figure 10:
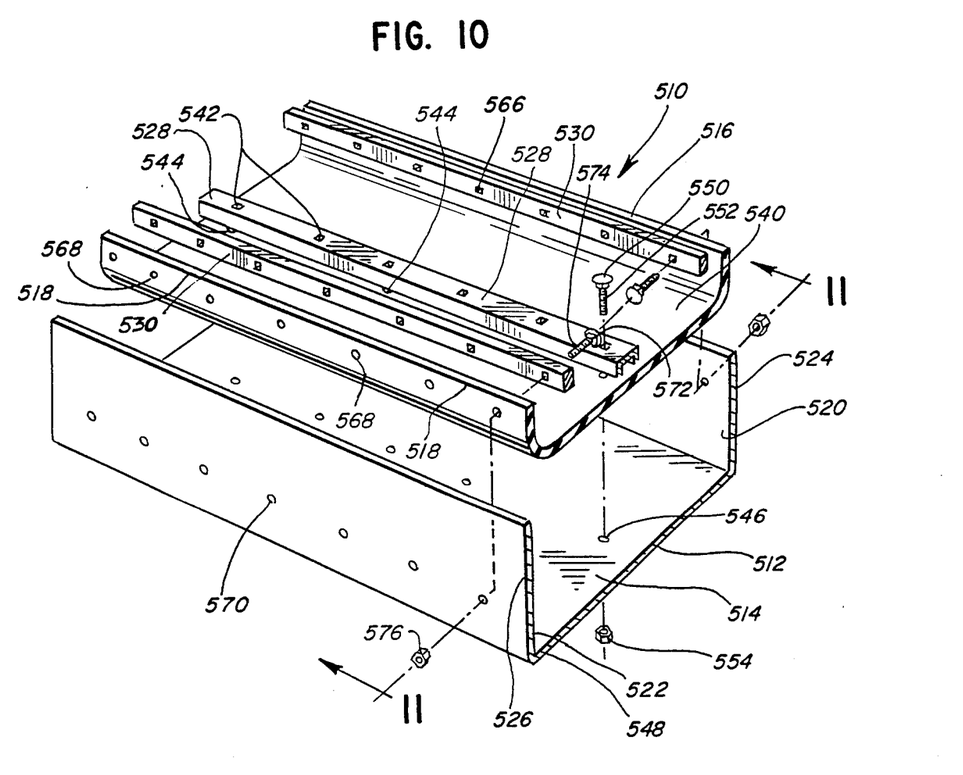
FIG. 10 is an exploded, perspective view of a portion of the conveying trough with a liner according to the present invention incorporated.
Figure 11:
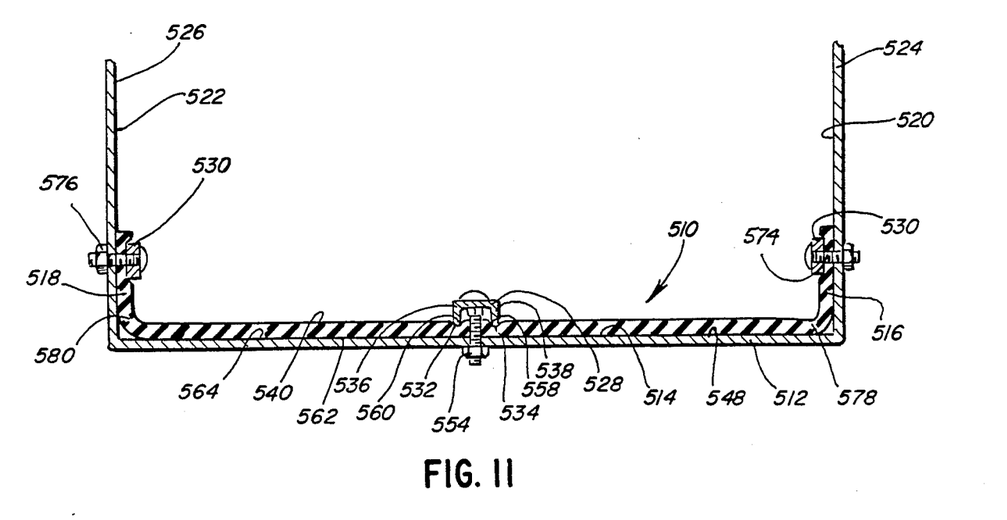
FIG. 11 is a sectional view of the trough with the liner in place along line 11—11 of FIG. 10.

The liner is shown generally at 510 in FIGS. 10 and 11 in association with a section of trough 512 that is U-shaped in cross section. The liner is preferably formed from a rubber sheet, which may be, for example, on the order of 5/16 of an inch in thickness, and has a width greater than the width of the bottom surface 514 of the trough 512. The liner is centered on the bottom surface 514 and is of sufficient width that its lateral edges 516, 518 can be turned upwardly against the inside surfaces 520, 522 of the spaced side walls 524, 526 of the trough. Preferably, the liner extends upwardly along the surfaces 520, 522 on the order of 6 inches. This dimension may vary depending on the particular application for the system.

The rubber liner is affixed to the trough 512 using clamp bars 530 and, when the trough is quite wide, may use at least one clamp channel 528. The clamp bars 530 are used to keep the lateral edges 516, 518 of the liner closely against the inside surfaces 520, 522 of the trough. The clamp bars preferably have a rectangular cross section with equidistantly spaced holes 566 aligned with holes 568 in the liner and holes 570 in the trough side walls 524, 526. The holes 566 in the clamp bar are squared to key the head 572 of carriage bolts 574 which, in conjunction with associated nuts 576, draw the clamp bars firmly against the side walls 524, 526 with the liner edges in captive relationship.

When the trough is quite wide, the mid-portion of the liner is best affixed to the bottom wall 548 of the trough by clamp channel 528. The clamp channel is U-shaped in cross section and inverted so that the free edges 532, 534 of the legs 536, 538 respectively of the U can be brought to bear against the upwardly facing surface 540 of the liner. A series of square holes 542 are provided equidistantly along the length of the clamp channel. The holes 542 align with holes 544 in the liner and holes 546 in the bottom wall 548 of the trough 512. The holes 542 are preferably squared to make keyed connection with the heads 550 of carriage bolts 552 which, in conjunction with associated nuts 554 secured against the outside surface 556 of the bottom wall 548, draw the clamp channel 528 compressively against the liner. The downwardly borne channel legs produce slight indentations 558, 560 and compress the liner thereunder so as to prevent any tendency of the liner to shift laterally. This results in positive intimate engagement of the bottom surface 562 of the liner with the upwardly facing surface 564 of the trough 512. In one embodiment, the holes in the clamp channel, liner and trough are spaced lengthwise of the trough on approximately one and one half foot centers.

The holes in the clamp bars are preferably spaced closer together than the holes in the clamp channel. The clamp bars serve not only to hold the lateral edges 516, 518 of the liner against the side walls but also resist the tendency of the liner edges to flex upwardly. In situating the liner, the central portion of the liner is first placed against the bottom surface 514 of the trough. The lateral edges 516, 518 are then compressed between the side walls and are urged downwardly so that intimate facial contact is established along as much of the bottom surface 514 of the trough as possible to maximize the transmission of vibration from the trough through the liner. A substantial downward force is required to seat the liner properly but must not be of such magnitude as to effect bulging of the liner between the side walls. FIG. 11 illustrates one preferred position of the liner with tightly curved corners 578, 580 at the juncture of the side walls and bottom wall of the trough.

FIGS. 5, 6, 8 and 9 illustrate the liner in position in the system shown in those figures. In FIG. 5, a liner 510 is shown on each trough plateau 216, 206, 218 and 243. In each case, the liner is fit in the manner shown in FIGS. 10 and 11, using clamp channels 528 and clamp bars 530. The only modification required for the liner in FIG. 5 is the provision of openings 582 coincident with the openings 215 in the perforate deck 211. These openings permit passage of particles in the manner previously described with respect to the system in FIGS. 5 and 6. In most cases, the liner 510 will not be used in the area or zone of the openings 215 in the perforate deck 211. When no liner 510 is used in the area of the openings 215, the liner 510 is tapered into and out of the area or zone of the perforate deck 211 so that the material will flow continuously along the trough.

In FIGS. 8 and 9, a liner 510 is shown operatively associated with each plateau on the trough 210 as in FIGS. 5 and 6. The only modification to the system in FIGS. 8 and 9 from the liner in the FIG. 5 system is that the liner on the upper plateau terminates at the beginning of the fluidizing deck 406 having the openings 408 in the foraminous surface 405 to allow passage of air consistently with the operation previously described with respect to the system in FIGS. 8 and 9. The liner 510 could optionally extend over the fluidizing deck 406 whereupon openings would be provided in the liner to align with the openings 408 in the deck 406. It is understood that the liner may or may not extend over the openings 215 in the perforate deck 211. If it extends over the perforate deck appropriate aligned openings will be provided as was pointed out with respect to FIG. 5.

It can be seen that the liner will be in intimate facial contact with the bottom surface of the trough so that vibrations are positively imparted to the liner, which supports the particles. The inherent resilience of the rubber liner adds an additional dimension to the systems in developing a live conveying surface. This is particularly beneficial in separation structures wherein the particles fall from one conveying surface to the next. The particles rebound from the rubber liner and rebound and collide more violently than they would with a conventional trough surface. More thorough breakup of particles results. The resilient rubber surface generally resists the tendency of particles to accumulate and prevents stagnation along the trough surface(s). The systems with the liner exhibit improved operating characteristics, particularly with sticky and moist materials. Further, the liner protects the conveying surface and is capable of being readily replaced. In systems having several plateaus, the liner can be placed on all of the conveying surfaces or selectively on any one or more.

It should be understood that the foregoing description was made for purposes of clarifying the structure and operation of the invention, with no unnecessary limitations to be derived therefrom.

I claim:

1. An improved vibratory apparatus having a vibrating trough for conveying material composed of wet, damp, sticky or tacky particles that tend to adhere together in clumps in a first direction, said trough having an upwardly facing substantially flat surface for supporting the material and spaced, associated side walls extending upwardly from the upwardly facing surface and bounding in conjunction with the upwardly facing surface a conveying space for the material, and means above at least a portion of the upwardly facing trough surface for delivering material by dropping material on the upwardly facing trough surface portion, the improvement comprising:

a resilient liner having an upper surface and a lower surface;

means for affixing the resilient liner to the side walls of the trough with the lower surface of the liner in engagement with the upwardly facing surface of the trough so that the material being conveyed is supported directly on the upper surface of the liner;

vibratory means for vibrating said trough for moving said clumps of material along said resilient liner and trough;

said resilient liner enhancing both the breakup of the clumps of material delivered to the trough and the vibratory action of the trough to afford positive conveyance particularly of said clumps of materials having particles tending to adhere to each other and to the trough; and means for maintaining the lower surface of the liner in flat engagement and in intimate contact with the flat upwardly facing trough surface beneath the material delivery means as the trough is vibrated by the vibrating means.

2. The improved vibratory apparatus according to claim 1 wherein said liner comprises rubber.

3. The improved vibratory apparatus according to claim 1 wherein the liner has spaced edges which are formed upwardly against the trough side walls.

4. The improved vibratory apparatus according to claim 3 wherein said means for affixing the resilient liner comprises first and second elongate clamp bars and means mount the first clamp bar so that one of the liner edges is held captive between the first clamp bar and one of the trough sidewalls and means mount the second clamp bar so that the other of the liner edges is held captive between the second clamp bar and the other of the trough side walls.

5. The improved vibratory apparatus according to claim 1 wherein said means for maintaining the resilient liner comprises an elongate clamp channel that has an inverted U-shape in cross-section and means mount the channel so that the liner is held captive between the clamp channel and the upwardly facing surface of the trough, said clamp channel being aligned so that its length substantially aligns with the first conveying direction.

6. An improved vibratory separating apparatus of the type having an upwardly facing conveying surface for moving a composite mixture composed of wet, damp, sticky or tacky particles that tend to adhere together in clumps between an inlet end and a discharge end and having a first conveying plateau and a second conveying plateau spaced downstream from the first plateau toward the discharge end and a drop-out opening between the first and second plateaus wherein conveyed particles from the first conveying plateau fall on a landing area on the second plateau, said first plateau directing the composite mixture substantially along a plane adjacent the drop-out opening and having an edge at the drop-out opening, and means for vibrating said second plateau to effect vibrating movement of the composite mixture, the improvement comprising:

a resilient liner having an upper surface and a lower surface; and means for fixedly maintaining the lower surface of the liner in continuous direct engagement with the upwardly facing conveying surface on the landing area as the conveying surface is vibrated so that the conveying material is at least partially supported directly on the upper surface of the liner, said resilient liner and conveying surface under the action of the vibrating means enhancing both breakup of the clumps of material and conveying action of the material to cause effective breakup and movement of the composite material.

7. The improved vibratory separating apparatus according to claim 6 wherein said conveying surface has a third plateau beneath the first plateau and a second resilient liner is provided on the third plateau.

8. The improved vibratory separating apparatus according to claim 7 wherein the third plateau is bounded transversely to the conveying direction by spaced sidewalls and means mount the liner to each of the spaced sidewalls and to the conveying surface on the third plateau.

* * * * *

UNITED STATES PATENT AND TRADEMARK OFFICE
CERTIFICATE OF CORRECTION

PATENT NO. : 4,844,235

DATED : July 4, 1989

INVENTOR(S) : RAYMOND W. SHERMAN

It is certified that error appears in the above-identified patent and that said Letters Patent is hereby corrected as shown below:

Column 5, line 57, after "flanges" correct "270" to --270'--;
line 65, after "nuts" correct "o" to --on--;

Column 6, line 1, after "adjustment" cancel "being" and insert in lieu thereof --is--;
line 25, after "plate" change "360" to --360'--;
Line 65, after "particles" cancel "falling" and insert in lieu thereof --will fall--, and after "out" insert --of--;

Column 7, line 33, after "extending" cancel "too" and substitute therefor --to--;
line 34, after "406" cancel "is" and substitute therefor --has--;

Column 9, line 55, after "area" cancel "of" and insert in lieu thereof --in which--;
line 56, after "215" insert --are located--;
line 57, before "perforate" insert --openings in the--.

Signed and Sealed this

Second Day of January, 1990

*Attest:*

JEFFREY M. SAMUELS

*Attesting Officer*   *Acting Commissioner of Patents and Trademarks*